US011704226B2

(12) United States Patent
Hasabnis et al.

(10) Patent No.: US 11,704,226 B2
(45) Date of Patent: Jul. 18, 2023

(54) METHODS, SYSTEMS, ARTICLES OF MANUFACTURE AND APPARATUS TO DETECT CODE DEFECTS

(71) Applicant: Intel Corporation, Santa Clara, CA (US)

(72) Inventors: Niranjan Hasabnis, Fremont, CA (US); Justin Gottschlich, Santa Clara, CA (US); Jeremie Dreyfuss, Raanana (IL); Amitai Armon, Tel-Aviv (IL); Itamar Ben-Ari, Givat Hashlosha (IL); Oren David Kimhi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 17/483,431

(22) Filed: Sep. 23, 2021

(65) Prior Publication Data

US 2022/0012163 A1    Jan. 13, 2022

(51) Int. Cl.
*G06F 9/44*      (2018.01)
*G06F 11/36*     (2006.01)
*G06F 8/40*      (2018.01)
*G06F 8/73*      (2018.01)

(52) U.S. Cl.
CPC ............ *G06F 11/3648* (2013.01); *G06F 8/40* (2013.01); *G06F 8/73* (2013.01)

(58) Field of Classification Search
CPC .................................................. G06F 11/3648
USPC ........................................................ 717/124
See application file for complete search history.

(56) References Cited

U.S. PATENT DOCUMENTS

| 7,299,458 B2 * | 11/2007 | Hammes ................. G06F 8/447 717/133 |
| 8,381,148 B1 * | 2/2013 | Loh ........................ G06F 30/327 716/136 |
| 8,806,441 B2 * | 8/2014 | Chandra ................... G06F 8/75 717/126 |

(Continued)

OTHER PUBLICATIONS

J. Xu, F. Wang and J. Ai, "Defect Prediction With Semantics and Context Features of Codes Based on Graph Representation Learning," in IEEE Transactions on Reliability, vol. 70, No. 2, pp. 613-625, Jun. 2021.*

(Continued)

*Primary Examiner* — Francisco J Aponte
(74) *Attorney, Agent, or Firm* — Hanley, Flight & Zimmerman, LLC

(57) ABSTRACT

Methods, apparatus, systems, and articles of manufacture are disclosed to detect code defects. An example apparatus includes repository interface circuitry to retrieve code repositories corresponding to a programming language of interest, tree generating circuitry to generate parse trees corresponding to code blocks contained in the code repositories, directed acyclic graph (DAG) circuitry to generate DAGs corresponding to respective ones of the parse trees, the DAGs including control flow information and data flow information, abstraction generating circuitry to abstract the DAGs, invariant identification circuitry to extract invariants from the abstracted DAGs, and DAG comparison circuitry to cluster respective ones of the extracted invariants to identify respective ones of the abstracted DAGs with common invariants.

21 Claims, 14 Drawing Sheets

(56) References Cited

U.S. PATENT DOCUMENTS

| | | | | |
|---|---|---|---|---|
| 9,021,409 | B2* | 4/2015 | Vasudevan | G06F 30/3323 |
| | | | | 716/108 |
| 9,177,017 | B2* | 11/2015 | De Smet | G06F 16/2452 |
| 9,672,018 | B2* | 6/2017 | Harman | G06F 16/00 |
| 9,696,974 | B2* | 7/2017 | Pamer | G06F 8/437 |
| 10,025,569 | B2* | 7/2018 | Davis | G06F 8/443 |
| 10,209,963 | B2* | 2/2019 | Hutchison | G06F 3/0631 |
| 10,521,197 | B1* | 12/2019 | Ciolfi | G06F 8/34 |
| 10,628,282 | B2* | 4/2020 | Soares | G06F 11/3636 |
| 10,871,950 | B2* | 12/2020 | De Smet | G06F 16/9024 |
| 10,877,874 | B2* | 12/2020 | Alluri | G06F 11/3684 |
| 10,915,422 | B2* | 2/2021 | Bouissou | G06F 8/43 |
| 11,249,888 | B1* | 2/2022 | Campos Perez | G06F 11/3684 |
| 11,294,665 | B1* | 4/2022 | Foster | G06F 8/71 |
| 11,347,501 | B1* | 5/2022 | Li | G06F 8/71 |
| 11,455,152 | B2* | 9/2022 | Zhang | G06N 3/02 |
| 11,474,795 | B2* | 10/2022 | Moussa | G06F 8/43 |
| 11,507,352 | B1* | 11/2022 | Dolby | G06F 11/3608 |
| 11,526,429 | B1* | 12/2022 | Dutta | G06F 11/3684 |
| 2005/0251707 | A1* | 11/2005 | Alexander, III | G06F 11/3612 |
| | | | | 714/49 |
| 2007/0266366 | A1* | 11/2007 | Bucuvalas | G06F 11/3612 |
| | | | | 717/104 |
| 2009/0077542 | A1* | 3/2009 | Chou | G06F 11/3612 |
| | | | | 717/132 |
| 2012/0084695 | A1* | 4/2012 | Higgins | G06F 3/0484 |
| | | | | 715/771 |
| 2014/0067871 | A1* | 3/2014 | Meek | G06F 40/154 |
| | | | | 707/E17.044 |
| 2014/0278307 | A1* | 9/2014 | Hosey | G06F 30/20 |
| | | | | 703/6 |
| 2015/0363294 | A1* | 12/2015 | Carback, III | G06F 8/70 |
| | | | | 717/132 |
| 2016/0170859 | A1* | 6/2016 | Bucuvalas | G06F 11/3608 |
| | | | | 717/132 |
| 2017/0075787 | A1* | 3/2017 | Muske | G06F 11/3608 |
| 2020/0210158 | A1* | 7/2020 | Bucuvalas | G06F 8/75 |
| 2021/0081310 | A1 | 3/2021 | Gottschlich | |
| 2021/0182031 | A1* | 6/2021 | Ye | G06F 8/77 |
| 2022/0012163 | A1* | 1/2022 | Hasabnis | G06F 11/3648 |
| 2022/0019410 | A1* | 1/2022 | Cangea | G06F 8/33 |
| 2022/0107792 | A1* | 4/2022 | Gottschlich | G06F 40/30 |
| 2022/0188084 | A1* | 6/2022 | Goswami | G06F 8/427 |
| 2022/0188215 | A1* | 6/2022 | Goswami | G06F 8/71 |
| 2023/0068689 | A1* | 3/2023 | Dutta | G06F 11/3676 |

OTHER PUBLICATIONS

Britton et al., "Reversible Debugging Software: Quantify the time and cost saved using reversible debuggers," University Cambridge, Jan. 1, 2013, 18 pages.

Gottschlich et al., "The Three Pillars of Machine Programming," arXiv:1803.07244 [cs.AI], [https://doi.org/10.48550/arXiv.1803.07244], Jun. 26, 2021, 11 pages.

LLVM, "Clang Static Analyzer," Retrieved from https://clang-analyzer.llvm.org/, retrieved on Mar. 1, 2023, 2 pages.

"Cppcheck—A tool for static C/C++ code analysis," Retrieved from http://cppcheck.sourceforge.io//, retrieved on Mar. 1, 2023, 5 pages.

Dinella et al., "Hoppity: Learning Graph Transformations to Detect and Fix Bugs in Programs," Eighth International Conference on Learning Representations (ICLR 2020), Apr. 26, 2020, 17 pages.

Pradel et al., "DeepBugs: A Learning Approach to Name-based Bug Detection," arXiv:1805.11683 [cs.SE], [hhttps://doi.org/10.48550/arXiv.1805.11683], Apr. 30, 2018, 23 pages.

Hasabnis et al., "ControlFlag: A Self-supervised Idiosyncratic Pattern Detection System for Software Control Structures," 34th Conference on Neural Information Processing Systems (NeurIPS 2020), Dec. 6, 2020, 12 pages.

Johnson et al., "Why Don't Software Developers Use Static Analysis Tools to Find Bugs?," Proceedings of the 2013 International Conference on Software Engineering(ICSE 2013), published May 18, 2013, 10 pages.

Curl, "Re: Potential confusion in http_proxy.c and a recommendation," Retrieved from https://curl.se/mail/lib-2020-11/0028.html, dated Nov. 9, 2020, retrieved on Mar. 1, 2023, 2 pages.

Allen, "Control flow analysis," SIGPLAN Notices, Association for Computing Machinery, published Jul. 1, 1970, 19 pages.

Horn et al., "Ment and Spectre,", Retrived from https://meltdownattack.com/, retrieved on Mar. 1, 2023. 9 pages.

Cooper et al., "Data-Flow Analysis" abstract, Engineering a Compiler(Third Edition), printed Oct. 16, 2022, accessed via ScienceDirect on Mar. 1, 2023, 2 pages.

Hasabnis et al., "Light-weight Bounds Checking," IEEE/ACM International Symposium on Code Generation and Optimization, Mar. 31, 2012, 10 pages.

\* cited by examiner

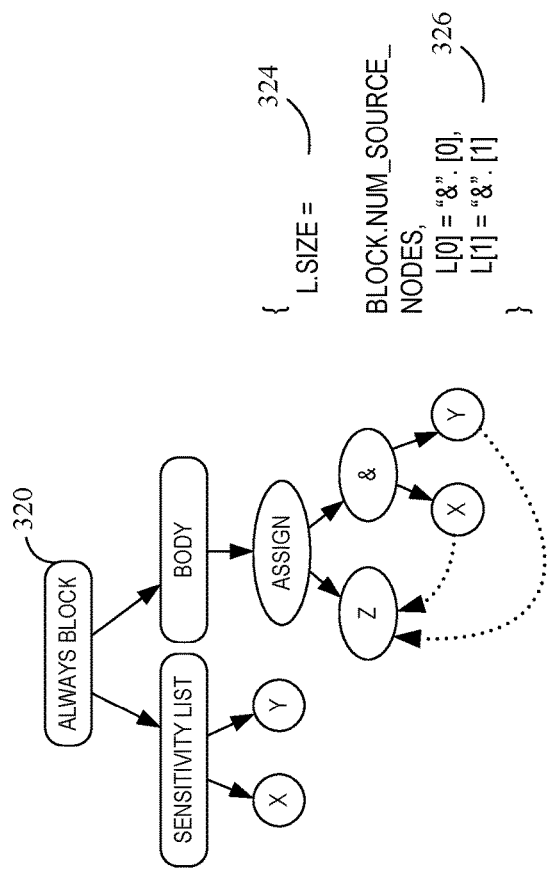
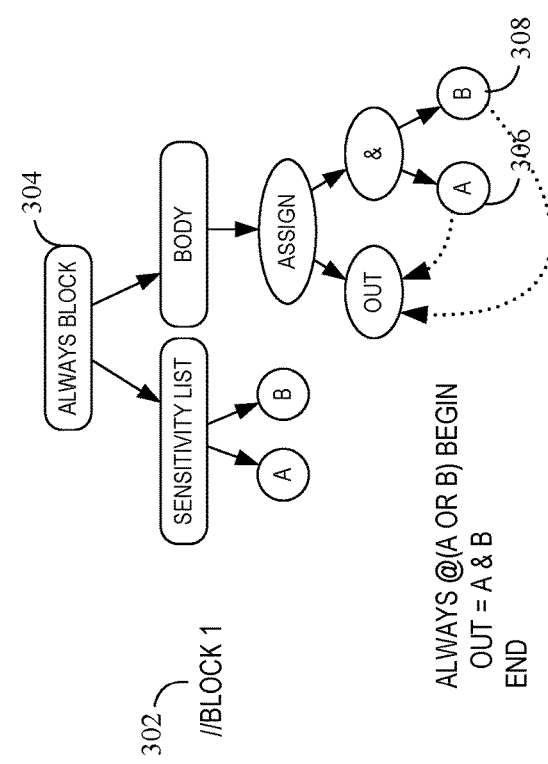
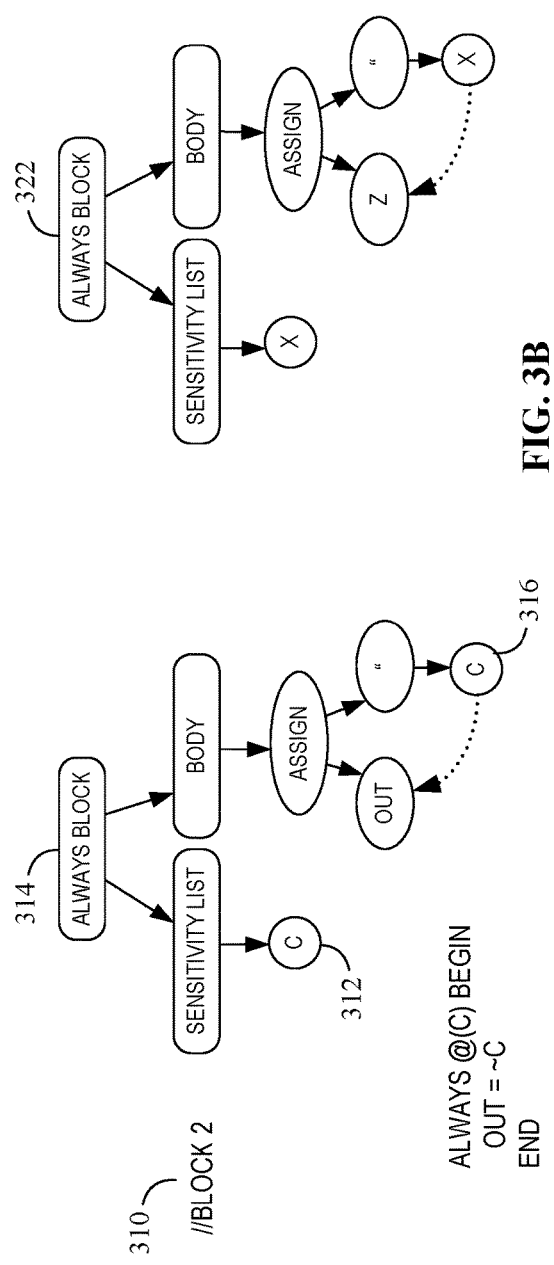
FIG. 3A
FIG. 3B

METHODS, SYSTEMS, ARTICLES OF MANUFACTURE AND APPARATUS TO DETECT CODE DEFECTS

FIELD OF THE DISCLOSURE

This disclosure relates generally to code development improvements and, more particularly, to methods, systems, articles of manufacture and apparatus to detect code defects.

BACKGROUND

In recent years, code development efforts have focused on reducing code errors in an effort to avoid and/or otherwise reduce corresponding hardware faults that are derived from faulty code. Typically, modern compilers have some degree of code error checking, such as debuggers that identify syntax errors in code.

BRIEF DESCRIPTION OF THE DRAWINGS

FIGS. 3A and 3B illustrate example DAG generation based on candidate code blocks.

Figure 1:
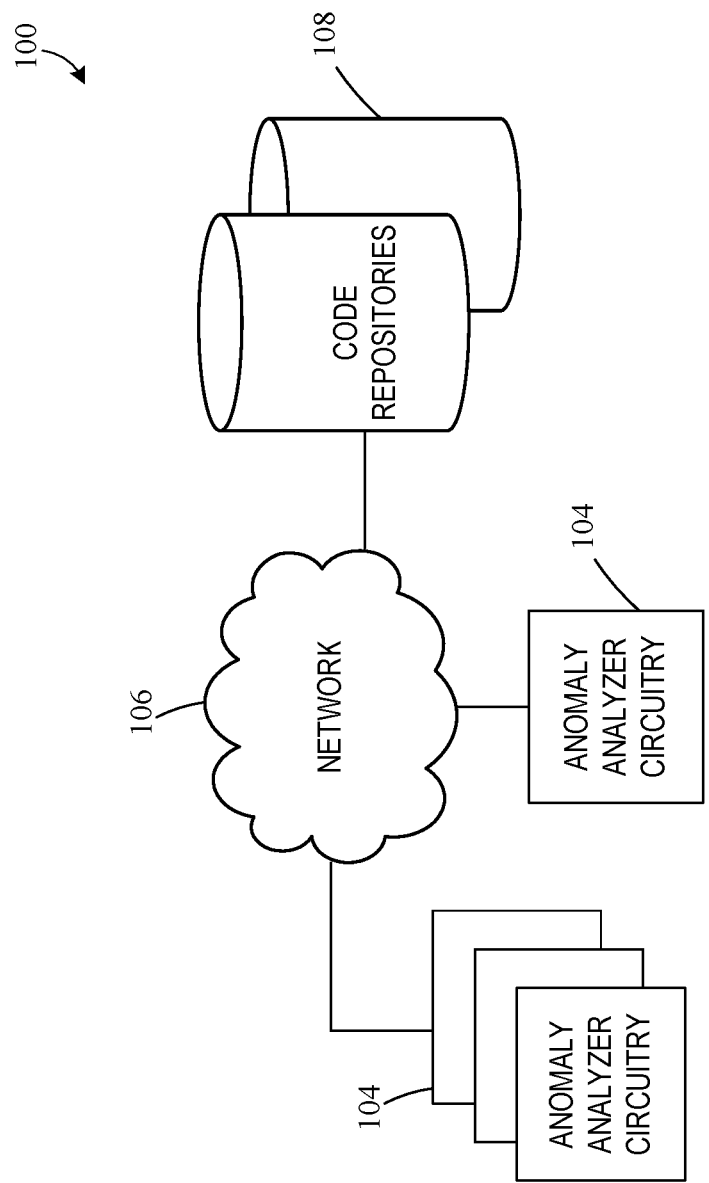
FIG. 1 is a schematic illustration of an example environment to detect code defects.

The figures are not to scale. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor/Processing Units (CPUs), Graphics Processor/Processing Units (GPUs), Digital Signal Processors (DSPs), XPUs, or microcontrollers and integrated circuits such as Application Specific Integrated Circuits (ASICs). The aforementioned examples of processor circuitry include control circuitry to control data movement within the processor circuitry. Example processor circuitry also includes arithmetic and logic circuitry to perform one or more operations corresponding to instructions, and one or more registers to store result(s) of the one or more operations. For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Approximately 50% of software development time is spent in debugging code. In some circumstances, code development efforts focus on eliminating code errors prior to implementing such code as a hardware device, such as field programmable gate arrays (FPGAs), application-specific integrated circuits (ASICs), CPUs, processor cores, accelerators, and/or other specialized processing circuitry. In some examples, code that is eventually to be realized (e.g., constructed, produced, fabricated, etc.) in hardware is developed in hardware description languages (HDLs), such as Verilog®. In the event code errors are not detected and/or otherwise resolved before being implemented in hardware, substantial financial, safety and/or public relations damage may occur.

However, while code development environments (including compilers) reveal syntactical errors in code (e.g., using an incorrect data type for a parameter), additional code errors include semantic errors that most compilers do not consider and/or otherwise evaluate. An example code error shown below (Example 1) will not cause an error notification by a compiler:

always @(a) begin
  out=a & b
end

Example 1

The code of Example 1 will trigger when the variable a changes. In response to this variable change, the variable out will be updated with the value of a and b. However, the variable out should also be updated when b changes because the variable out depends on both variables a and b. The drafter of the code in Example 1 overlooked specifying variable b in the sensitivity list (i.e., inside the parenthesis after @). As such, the code of Example 1 will miss updates to the variable out when only variable b changes. An example correction to the code of Example 1 is shown below as Example 2:

always @(a or b) begin
  out=a & b
end

Example 2

The code of Example 2 includes an (see bolded) or condition that now evaluates both variables a and b. In other words, a size of the sensitivity list must be equal to a number of output variables. As such, the code of Example 2 is both syntactically valid and semantically valid, so a compiler will not report any syntax error.

Examples disclosed herein expose code errors that include semantic issues that traditional compilers cannot identify. Additionally, examples disclosed herein detect code invariants in a programming agnostic manner such that corresponding defects can be identified when the invariants do not hold true (e.g., because of semantic issues). As disclosed in further detail below, examples disclosed herein perform abstractions on DAGs such that syntax and/or semantic defects are identified and modeled to avoid reliance upon programming language (PL) specific nuances.

FIG. 1 is a schematic illustration of an example environment 100 to detect code defects. In the illustrated example of FIG. 1, the environment 100 includes input 102 retrieved and/or otherwise received by example anomaly analyzer circuitry 104. Example input 102 includes, but is not limited to code written by code developers (e.g., users of the example anomaly analyzer circuitry 104) and/or previously stored code (e.g., stored in one or more memories, databases, etc.). Example anomaly analyzer circuitry 104 includes, but is not limited to computers, servers and/or computing terminals including, for example, user interfaces to accept code developer input 102. The example anomaly analyzer circuitry 104 of FIG. 1 may, additionally or alternatively, be communicatively connected to one or more networks 106, thereby allowing the example input 102 to be retrieved and/or otherwise received from any network-accessible computing device. The example environment 100 includes one or more code repositories 108. Example code repositories 108 include, but are not limited to memories, storage devices and/or databases that contain code repositories, such as GitHub.

Figure 2:
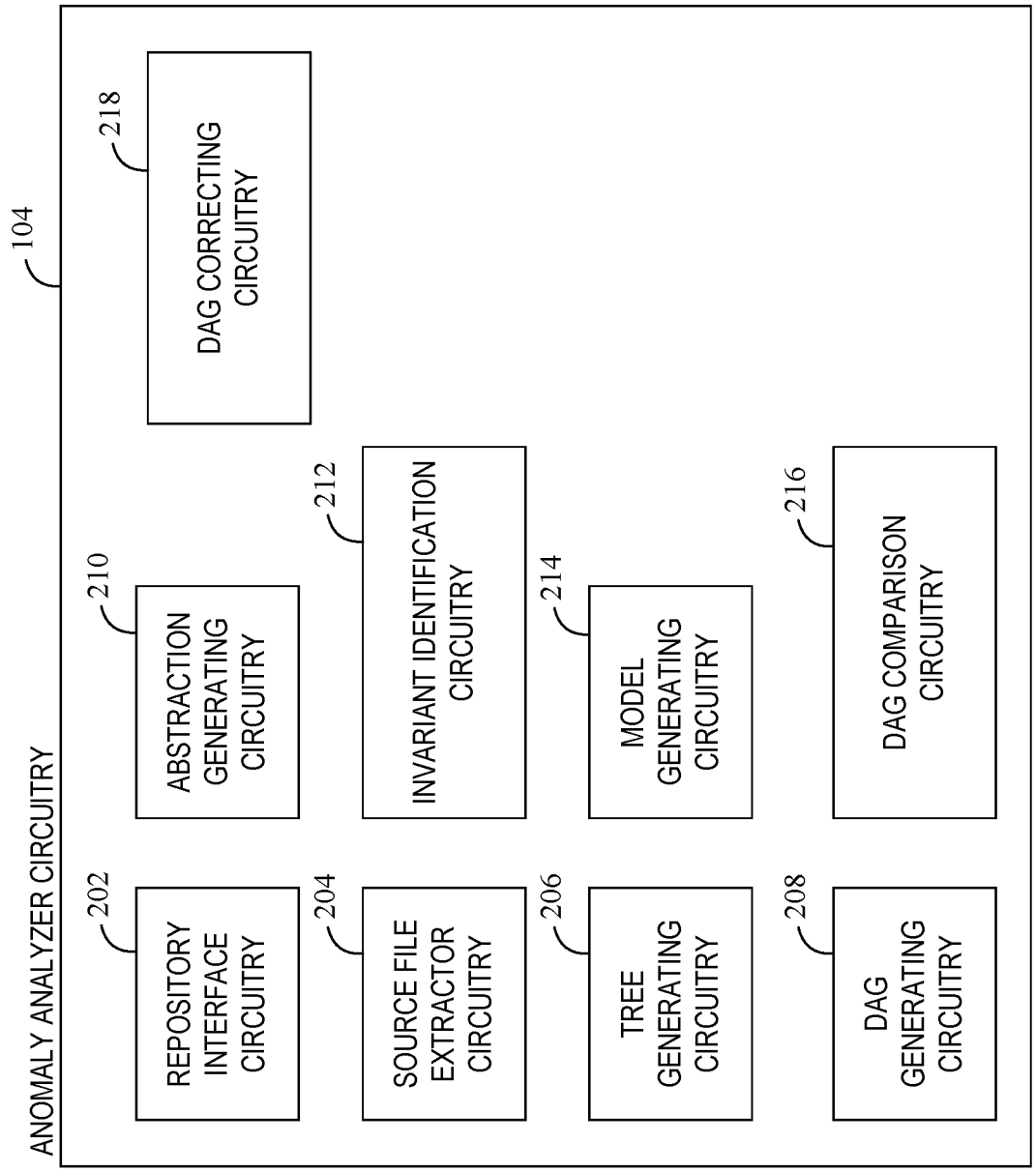
FIG. 2 is a schematic illustration of example anomaly analyzer of FIG. 1 to detect code defects.

FIG. 2 illustrates additional details corresponding to the example anomaly analyzer circuitry 104 of FIG. 1. In the illustrated example of FIG. 2, the anomaly analyzer circuitry 104 includes example repository interface circuitry 202, example source file extractor circuitry 204, example tree generating circuitry 206, example DAG generating circuitry 208, example abstraction generating circuitry 210, example invariant identification circuitry 212, example model generating circuitry 214, example DAG comparison circuitry 216, and example DAG correcting circuitry 218.

In operation, the example report interface circuitry 202 obtains code to be checked for code defects. In some examples, the input is code from code repositories when the example anomaly analyzer circuitry 104 is operating in a training mode, and the input is code from code developers when the example anomaly analyzer circuitry 104 is operating in an inference mode. In some examples, the repository interface circuitry 202 determines whether one or more repository lists are available, such as repository lists corresponding to GitHub and/or any other network accessible repository of source code. On the other hand, repositories may be retrieved and/or otherwise received from users of the example anomaly analyzer circuitry 104, such as via a user interface in which one or more files and/or storage locations are identified as the input 102. In some examples, the repository interface circuitry retrieves and/or otherwise obtains repositories from any number of sources that are devoid of label information corresponding to validity of the repositories and/or code therein. As used herein, code validity represents a capability of the code to perform at least one function/task without error. Examples disclosed herein enable code defect analysis from any source repository, and as code analysis increases examples disclosed herein improve an ability to identify invariants to be used during inference tasks. Code validity also includes indications of the presence of semantic code errors and/or syntactic code errors. In some examples, code repositories include rating information associated with code validity, such as community-based ranking information (e.g., a number of stars from one to five) and/or information indicative of a number of users that utilize particular code (e.g., greater numbers of users indicative of greater quality, utility, etc.). From the example obtained repositories, the example source file extractor circuitry 204 obtains a list of source files therein. The example tree generating circuitry 206 generates parse trees corresponding to the source files, which typically contain PL-specific code blocks to be analyzed. In some examples, specific PL code block analysis may be tailored and/or otherwise customized in view of (user) input(s), such as PL extensions of interest (e.g., "C" for c-language programs, "CPP" for c-plus-plus language programs, etc.).

The example DAG generating circuitry 208 performs control flow and data flow analysis on the generated parse trees in an effort to generate DAGs corresponding to the code blocks. In particular, generating the one or more DAGs identifies control flow edge and data flow edge information. Such discovered dependency information is added to and/or otherwise appended to the one or more DAGs by the example DAG generating circuitry 208. In some examples, code block analysis is performed in view of user customization having a particular focus on types of code blocks (e.g., code blocks focused on for loops, switch statements, particular mathematical algorithms, etc.). FIGS. 3A and 3B illustrate generating an example DAG. In the illustrated example of FIG. 3A, a first code block of interest 302 is shown in a manner substantially similar to Example 2 above. The example first code block of interest 302 corresponds to an assign function that may be derived from a Verilog application, but examples disclosed herein are not limited thereto. The example DAG generating circuitry 208 generates a corresponding first DAG 304, in which black solid lines/arrows represent the parse tree structure, and the dotted lines/arrows represent data flow. Note in the example of FIG. 3A that nodes a and b are children of the "&" operation and have outgoing data-flow edges to out. The example of FIG. 3A includes a first source node 306 ("a") and a second source node 308 ("b"), having dotted lines to out.

The illustrated example of FIG. 3B includes a second code block of interest 310. The example second code block of interest 310 also corresponds to an assign function. However, the illustrated example of FIG. 3B includes only a single variable in the sensitivity list (i.e., variable "c" 312). As such, the example DAG generating circuitry 208 generates a corresponding second DAG 314 to identify corresponding data flow edges, such as a single source node ("c") 316. After control flow edges and/or data flow edges of the control block of interest are identified by the example DAG generating circuitry 208, dependencies for each code block are added as appended information to the generated DAG (e.g., metadata). In some examples, dependencies are added by the example DAG generating circuitry 208 in a manner consistent with Example 3:

for_each edge e:
    add_edge(e.source, e.destination, e.type)

Example 3

In effect, the example DAG generating circuitry 208 creates and/or otherwise generates a DAG for a corresponding code block of interest. Aforementioned example techniques may be repeated as needed for any number of code blocks of interest identified in repositories and their extracted files.

In the event the example anomaly analyzer circuitry 104 is operating in a training mode, in which the objective of the training mode is to identify and model code invariants in a PL-agnostic manner, the example abstraction generating circuitry 210 performs DAG abstraction on the one or more DAGs generated by the example DAG generating circuitry 208. For example, variable names may originally represent specific nomenclature unlike code blocks in other languages despite the fact that those other languages perform the same tasks. As such, PL-specific elements of the code block are abstracted and/or otherwise converted to a normalized representation to permit PL-agnostic comparisons of code blocks. In some examples, the abstraction generating circuitry 210 maps and/or otherwise converts the one or more variables of the DAG in a manner consistent with Example 4:

```
Map=[ ]
for_each variable v:
    if v in Map:
        w=Map[v]
    else:
        //abstract name
        w=new name
        Map[v]=w
    Replace v with w
```

Example 4

In effect, the example abstraction generating circuitry 210 generates an abstracted DAG, thereby severing any nuance corresponding to any particular PL while maintaining the ability to identify relevant control flow and/or data flow characteristics that are indicative of invariants to be tested (e.g., invariants tested for violation occurrences indicative of syntax or semantic errors).

Briefly returning to the illustrated examples of FIGS. 3A and 3B, an example first abstracted DAG 320 is shown that corresponds to the example first DAG 304, and an example second abstracted DAG 322 is shown that corresponds to the example second DAG 314. Stated differently, the aforementioned abstraction replaces source and sink nodes in the graphs with variables (e.g., normalized variables unassociated with PL-specific nomenclature). Using the abstracted DAGs disclosed above, the example invariant identification circuitry 212 extracts invariants corresponding to the code blocks of interest. In some examples, the invariant identification circuitry 212 extracts invariants in a manner consistent with Example 5:

for_each input_var i:
    for_each output_var o:
        Find function $f: i \rightarrow o$ Example 5

Returning to the illustrated example of FIGS. 3A and 3B, the example invariant identification circuitry 212 learns an example first invariant 324 that a size of a sensitivity list must be the same as a number of source nodes of a DAG. The example invariant identification circuitry 212 learns an example second invariant 326 that captures positional dependencies between elements of the sensitivity list and the source nodes (see L[0]="&".[0]). Note that in some examples positional dependency may or may not be present in a particular PL. However, over-specification of invariants is an acceptable approach because as examples disclosed herein analyze additional code blocks, particular incorrectly-captured invariants will be pruned (e.g., via clustering and/or machine learning processes). In other words, clustering assists in the effort to unify and/or otherwise pruneout those invariants that are not common among code blocks, thereby reducing a quantity of invalid invariants.

Figure 4:
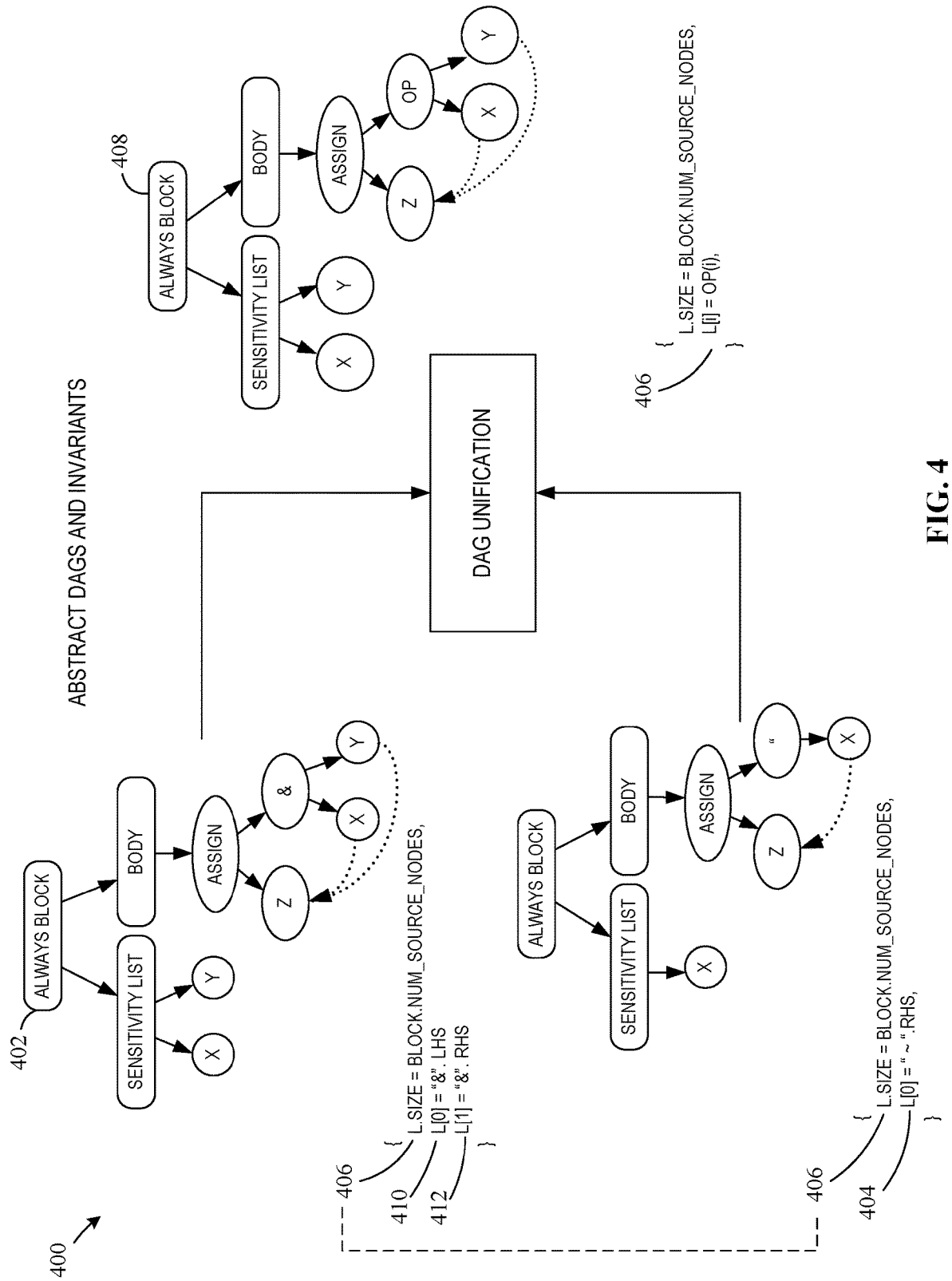
FIG. 4 illustrates example DAG unification to identify invariants that are common among different code blocks.

FIG. 4 illustrates example DAG unification 400 to identify particular invariants that are common among different code blocks. To illustrate, an example first DAG 402 and an example second DAG 404 both include a similar invariant common therebetween. In particular, an example first common invariant 406 identified by the example invariant identification circuitry 212 is "L.size=block.num_source_nodes", which as disclosed above, represents the invariant that a size of the sensitivity list must be the same as the number of source nodes of the DAG (e.g., also see reference number 324 of FIG. 3). As such, the example invariant identification circuitry 212 unifies and/or otherwise retains this common invariant to an example unified DAG 408. However, the example first DAG 402 includes an example second invariant 410 (L[0]="&".lhs) and an example third invariant 412 (L[1]="&".rhs), neither of which are common to an example fourth invariant 414 (L[0]="~".rhs) of the example second DAG 404. While the example second invariant 410 and third invariant 412 relates to an AND condition, and the example fourth invariant 414 relates to a NEGATION condition, the example invariant identification circuitry 212 normalizes and/or otherwise unifies a degree of abstracted similarity when such logic exists. For instance, the invariant identification circuitry 212 determines that the $i^{th}$ element of a list is going to come from the $i^{th}$ element of an operation (see element 416 L[i]=OP[i]). In other words, the invariant identification circuitry 212 unifies an abstract representation of invariants between different DAGs, sometimes referred to as a generic rule.

The example invariant identification circuitry 212 extracts one or more invariants from the code blocks and updates a list of known language-specific (PL-specific) invariants. As discussed above, the example model generating circuitry 214 unifies all abstracted DAGs and corresponding invariants in an effort to represent all the abstracted DAGs for a specific code block as compactly as possible. Stated differently, such an approach is analogous to clustering in machine learning. In some examples, the model generating circuitry 214 identifies a quantity of N subsets from the detected invariants in which each subset has a common prefix. As used herein, a "prefix" refers to common portions of invariants. To illustrate, strings of "good," "golden," gold," and "goat" share a common prefix "g." Similarly, a next common prefix for the above is "go." Additionally, the model generating circuitry 214 begins at a start node S and adds N branches based on those common prefixes. In some examples, the model generating circuitry 214 generates a decision tree and/or model of invariants in a manner consistent with Example 6:

```
for_each subset x of N:
    repeat discovery of N subsets having common
    prefixes
        repeat adding N branches based on
        discovered common prefixes starting
        from node S
    until prefix={ }
```

Example 6

Clustering of the abstracted DAGs with the aid of one or more machine learning models, causes generation of at least one invariant model to be used for inference modes of the example anomaly analyzer circuitry 104.

In the event the example anomaly analyzer circuitry 104 is operating in an inference mode, in which the objective of the inference mode is to identify code invariants that do not hold true (e.g., potential code defects) from input data that has not yet been analyzed (e.g., code blocks and/or repositories from code developers), the example DAG comparison circuitry 216 compares one or more DAGs corresponding to the input to previously learned invariants corresponding to the model. In some examples, the DAG comparison circuitry 216 invokes a Linux diff tool to identify difference between a failed DAG and learned invariants. In the event there are no violations of invariants for a particular code block input, the example DAG comparison circuitry 216 cycles through one or more additional DAGs corresponding to the input. In the event a violation is detected by the example DAG comparison circuitry 216, the example DAG correcting circuitry 218 generates at least one violation notification and instantiates the failed DAG using source and sink nodes to produce auto-corrected DAG information, which may be presented as a candidate solution to the code developer. For instance, in view of the illustrated example of FIG. 3, the detected invariant is L[i]=OP[i], which recognizes that inputs of the operation performed in the DAG must also be in the sensitivity list. As such, if a failed invariant is applied to Example 1 above, it becomes clear that 'b' must be listed in the sensitivity list because L[i]!=OP[i]. With that, a corresponding correction of L[i]=OP[i]=b can be performed so that the invariant holds true (passes).

In some examples, the repository interface circuitry 202 includes means for interfacing a repository, the source file extractor circuitry 204 includes means for extracting source files, the tree generating circuitry 206 includes means for generating trees, the DAG generating circuitry 208 includes means for generating a DAG, the abstraction generating circuitry 210 includes means for generating abstracted DAGs, the invariant identification circuitry 212 includes means for identifying invariants, the model generating circuitry 214 includes means for generating a model, the DAG comparison circuitry 216 includes means for comparing DAGs, the DAG correcting circuitry 218 includes means for correcting a DAG, and the anomaly analyzer circuitry 104 includes means for analyzing anomalies. For example, the means for interfacing a repository may be implemented by the repository interface circuitry 202, the means for extracting source files may be implemented by the file extractor circuitry 204, the means for generating a DAG may be implemented by the DAG generating circuitry 208, the means for generating abstracted DAGs may be implemented by the abstraction generating circuitry 210, the means for identifying invariants may be implemented by the invariant identification circuitry 212, the means for generating a model may be implemented by the model generating circuitry 214, the means for comparing DAGs may be implemented by the DAG comparison circuitry 216, the means for correcting a DAG may be implemented by the DAG correcting circuitry 218, and the means for analyzing anomalies may be implemented by the anomaly analyzer circuitry 104. In some examples, the repository interface circuitry 202, the source file extractor circuitry 204, the tree generating circuitry 206, the DAG generating circuitry 208, the abstraction generating circuitry 210, the invariant identification circuitry 212, the model generating circuitry 214, the DAG comparison circuitry 216, the DAG correcting circuitry 218 and the anomaly analyzer circuitry 104 may be implemented by machine executable instructions such as that implemented by at least the blocks of FIGS. 5-10 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the repository interface circuitry 202, the source file extractor circuitry 204, the tree generating circuitry 206, the DAG generating circuitry 208, the abstraction generating circuitry 210, the invariant identification circuitry 212, the model generating circuitry 214, the DAG comparison circuitry 216, the DAG correcting circuitry 218 and/or the anomaly analyzer circuitry 104 is implemented by other hardware logic circuitry, hardware implemented state machines, and/or any other combination of hardware, software, and/or firmware. For example, the repository interface circuitry 202, the source file extractor circuitry 204, the tree generating circuitry 206, the DAG generating circuitry 208, the abstraction generating circuitry 210, the invariant identification circuitry 212, the model generating circuitry 214, the DAG comparison circuitry 216, the DAG correcting circuitry 218 and the anomaly analyzer circuitry 104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the anomaly analyzer circuitry 104 of FIG. 1 is illustrated in FIGS. 1 and 2, one or more of the elements, processes, and/or devices illustrated in FIGS. 1 and/or 2 may be combined, divided, re-arranged, omitted, eliminated, and/or implemented in any other way. Further, the example repository interface circuitry 202, the example source file extractor circuitry 204, the example tree generating circuitry 206, the example DAG generating circuitry 208, the example abstraction generating circuitry 210, the example invariant identification circuitry 212, the example model generating circuitry 214, the example DAG comparison circuitry 216, the example DAG correcting circuitry 218 and/or, more generally, the anomaly analyzer circuitry 104 of FIGS. 1 and 2, may be implemented by hardware, software, firmware, and/or any combination of hardware, software, and/or firmware. Thus, for example, any of the example repository interface circuitry 202, the example source file extractor circuitry 204, the example tree generating circuitry 206, the example DAG generating circuitry 208, the example abstraction generating circuitry 210, the example invariant identification circuitry 212, the example model generating circuitry 214, the example DAG comparison circuitry 216, the example DAG correcting circuitry 218 and/or, more generally, the anomaly analyzer circuitry 104 of FIGS. 1 and 2, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example repository interface circuitry 202, the example source file extractor circuitry 204, the example tree generating circuitry 206, the example DAG generating circuitry 208, the example abstraction generating circuitry 210, the example invariant identification circuitry 212, the example model generating circuitry 214, the example DAG comparison circuitry 216, the example DAG correcting circuitry 218 and/or, more generally, the anomaly analyzer circuitry 104 of FIGS. 1 and 2 is/are hereby expressly defined to include a non-transitory computer readable storage device or storage disk such as a memory, a digital versatile disk (DVD), a compact disk (CD), a Blu-ray disk, etc., including the software and/or firmware. Further still, the example anomaly analyzer circuitry 104 of FIGS. 1 and 2 may include one or more elements, processes, and/or devices in addition to, or instead of, those illustrated in FIGS. 1 and/or 2, and/or may include more than one of any or all of the illustrated elements, processes and devices.

Flowcharts representative of example hardware logic circuitry, machine readable instructions, hardware implemented state machines, and/or any combination thereof for implementing the anomaly analyzer circuitry 104 of FIGS. 1 and 2 is shown in FIGS. 5-10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The programs may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 11, many other methods of implementing the example anomaly analyzer circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 5-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 5:
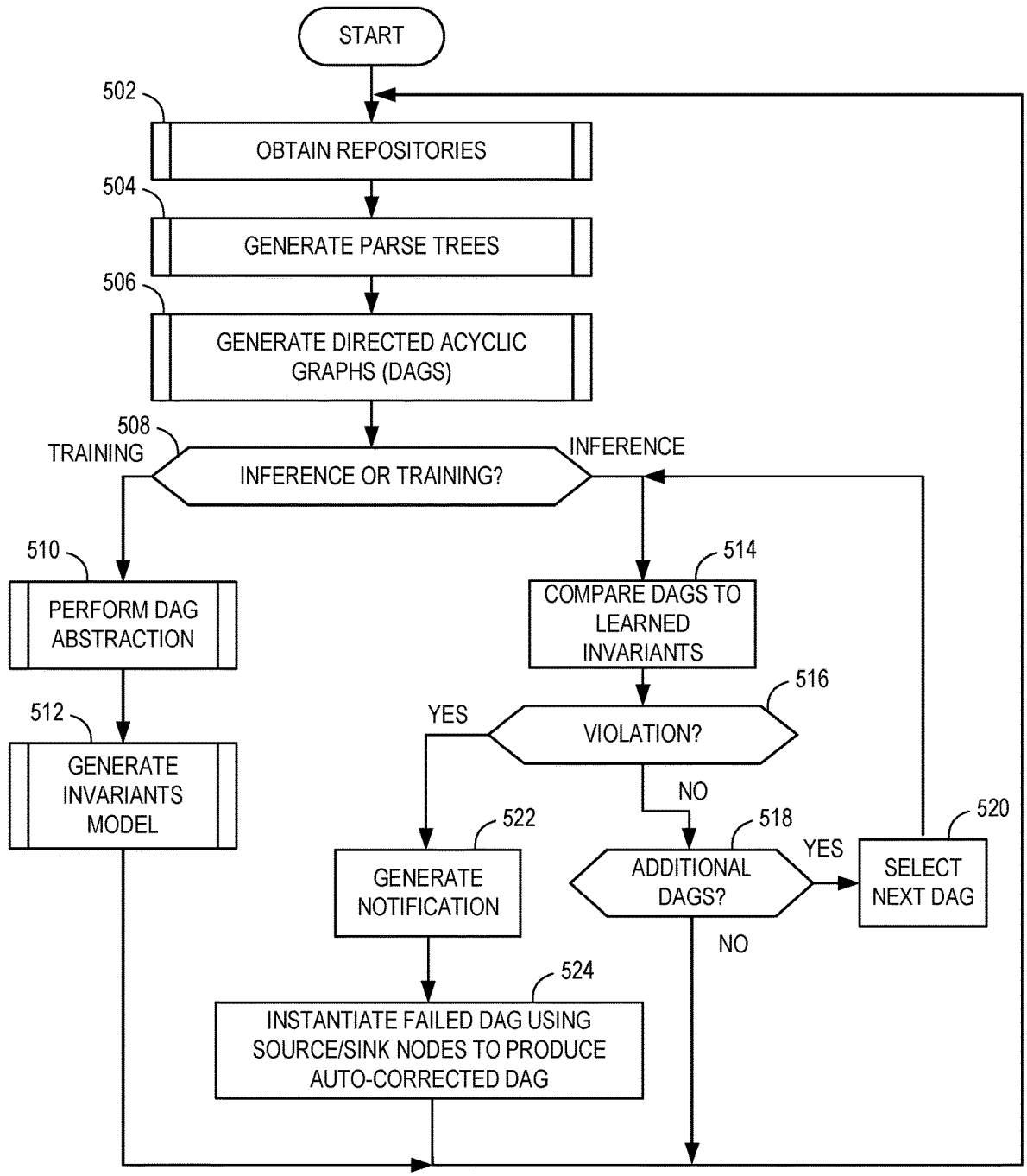
FIGS. 5-10 are flowcharts representative of example machine readable instructions that may be executed by example processor circuitry to implement the example anomaly analyzer circuitry of FIGS. 1 and/or 2 to detect code defects.

FIG. 5 is a flowchart 500 representative of example machine readable instructions and/or example operations that may be executed and/or instantiated by processor circuitry to detect code defects. The machine readable instructions and/or operations 500 of FIG. 5 begin at block 502, at which the example repository interface circuitry 202 obtains one or more repositories of interest, and discussed above and in further detail below. The example tree generating circuitry 206 generates one or more parse trees based on information obtained from the repositories (block 504), as described above and in further detail below. The example DAG generating circuitry 208 generates DAGs (block 506), and the example anomaly analyzer circuitry 104 determines whether to operate in an inference or a training mode (block 508).

In circumstances related to training, the example abstraction generating circuitry 210 performs DAG abstraction (block 510), as described above and in further detail below. As described above, DAG abstraction allows, in part, the detection of code defects to occur in a code-agnostic manner. The example model generating circuitry 214 generates one or more invariant models (block 512) to be used during inference activities.

In circumstances related to inference (block 508), the example DAG comparison circuitry 216 compares a DAG corresponding to a code block of interest to learned invariants (block 514) and determines whether an invariant violation has occurred (block 516). If not, the example DAG comparison circuitry 216 determines whether there are additional DAGs to analyze (block 518). If there are additional DAGs to analyze, the example DAG comparison circuitry 216 selects the next DAG of interest (block 520). However, in circumstances where a violation occurs (block 516), the example DAG correcting circuitry 218 generates a notification (block 522), and instantiates the failed DAG using source and/or sink node information to produce a corrected DAG and/or suggestions regarding a syntax or semantic defect in the code block of interest (block 524).

Figure 6:
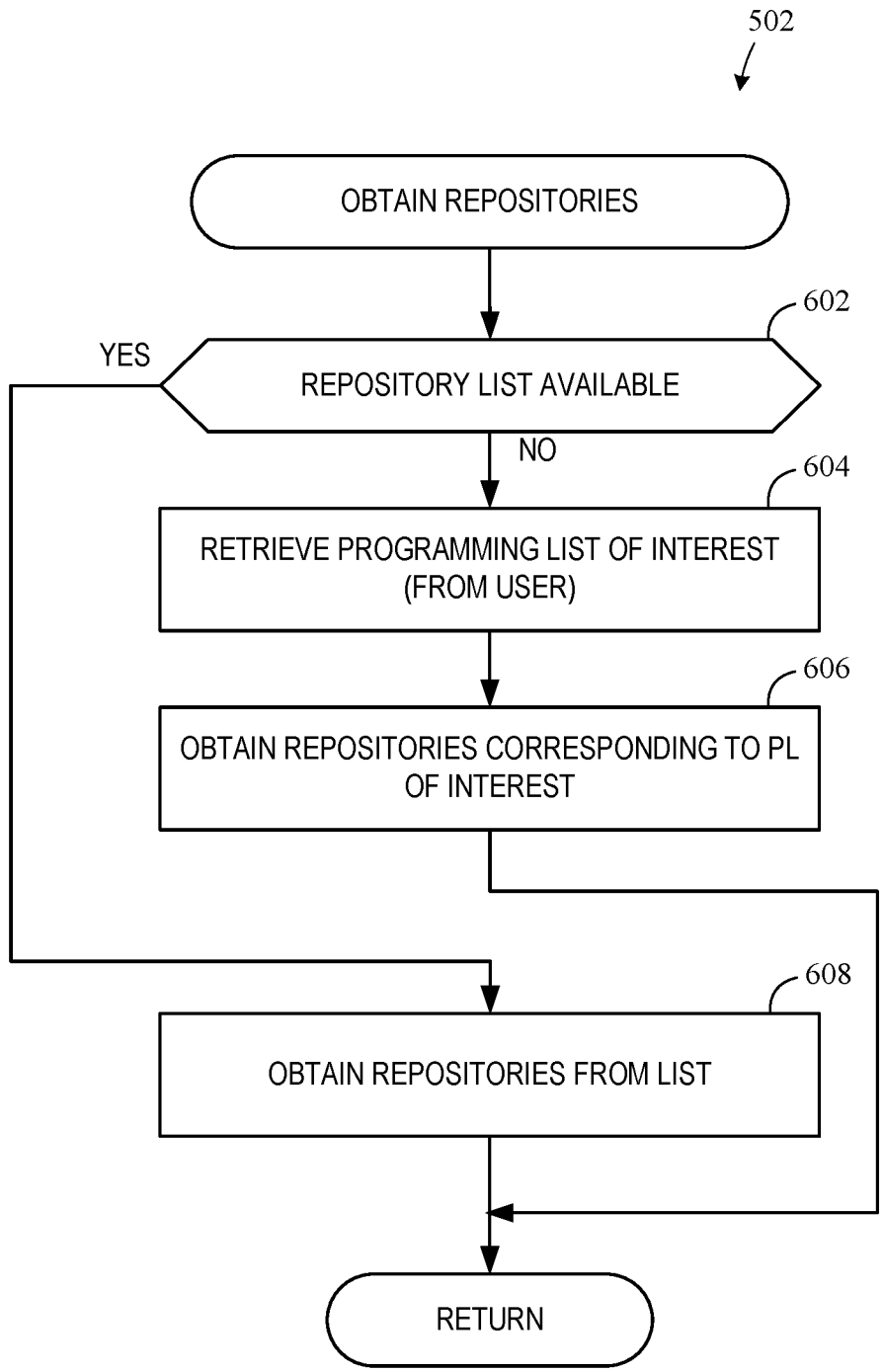

FIG. 6 illustrates further detail corresponding to obtaining repositories of block 502. In the illustrated example of FIG. 6, the example repository interface circuitry 202 determines whether a repository list is available (block 602). As discussed above, repository lists may include network accessible storage (e.g., lists of URLs) containing any number of files, such as those housed by GitHub. The example repository interface circuitry 202 obtains such repositories from the list (block 608). However, in the event repository lists are not available (block 602), the repository interface circuitry 202 retrieves and/or otherwise receives programming list(s) of interest (block 604), such as a list from a user. In some examples, the repository interface renders a user interface to facilitate navigation (e.g., by a user) to repositories and/or repositories identified on one or more lists. The repository interface circuitry 202 obtains the repositories from the lists (block 606) and control returns to block 504 of FIG. 5.

Figure 7:
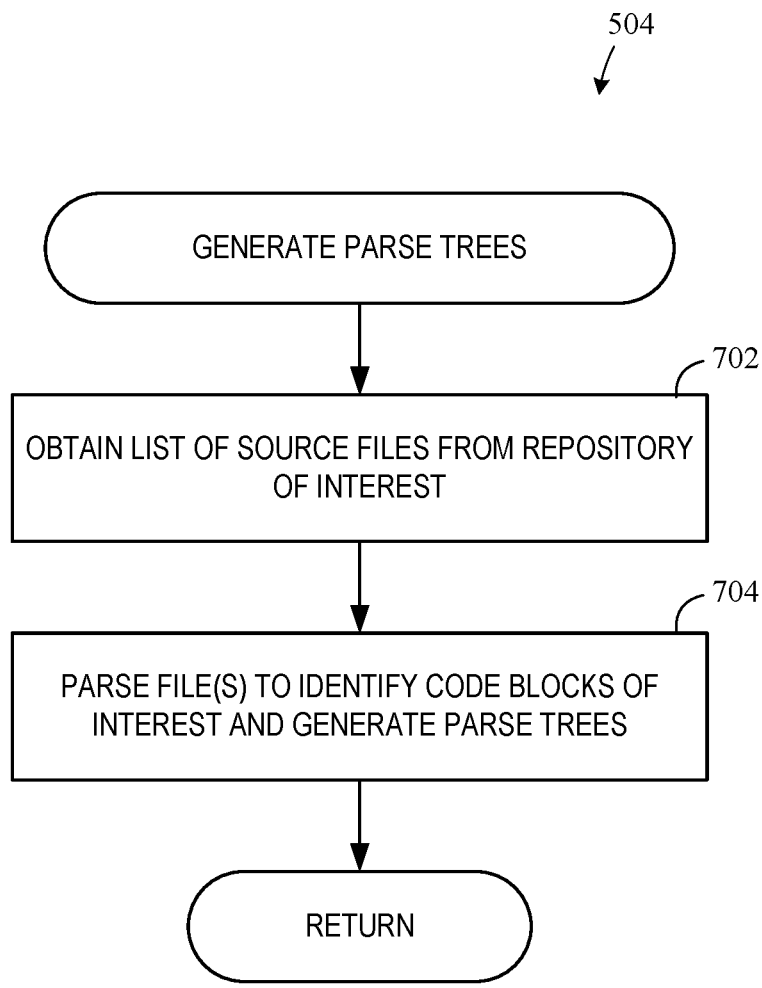

FIG. 7 illustrates further detail corresponding to generating parse trees (block 504) of FIG. 5. In the illustrated example of FIG. 7, the example source file extractor circuitry 204 obtains the list of source files from the repository of interest (block 702). The example tree generating circuitry 206 parses the files to identify code blocks of interest and generates parse trees (block 704). Control then returns to block 506 of FIG. 5.

Figure 8:
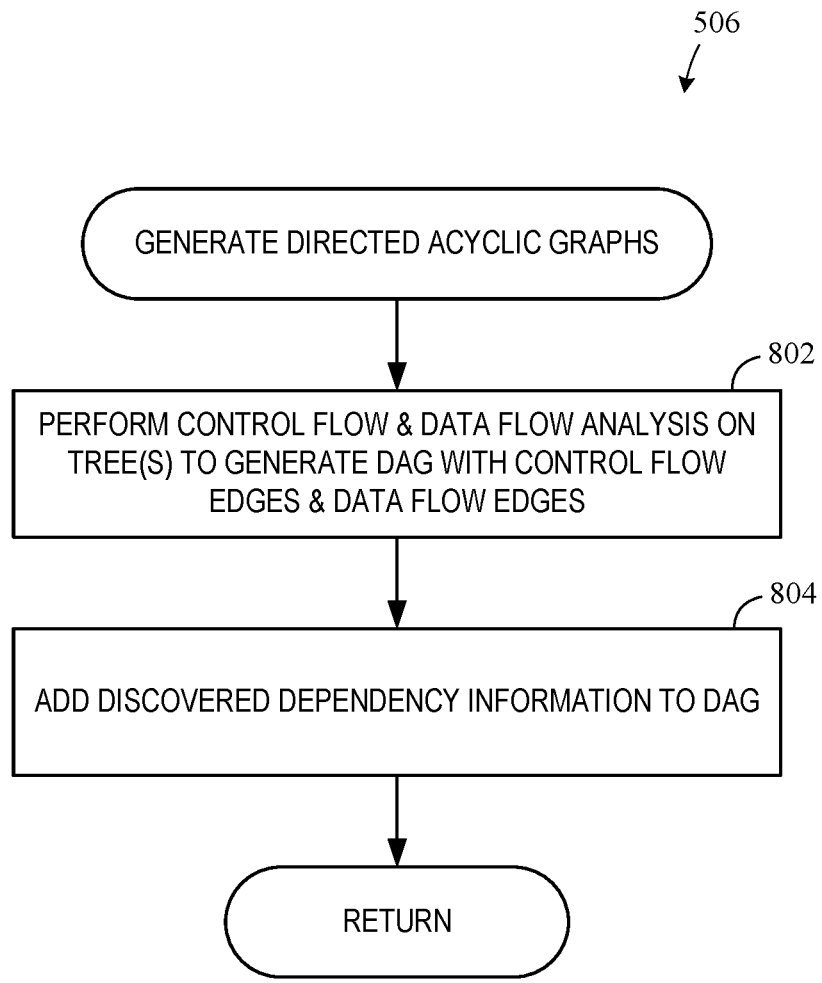

FIG. 8 illustrates further detail corresponding to generating DAGs (block 506) of FIG. 5. In the illustrated example of FIG. 8, the example DAG generating circuitry 208 performs control flow and data flow analysis on the parse trees (block 802). Additionally, the example DAG generating circuitry 208 adds the discovered dependency information to the DAG (block 804). Control then returns to block 508 of FIG. 5.

Figure 9:
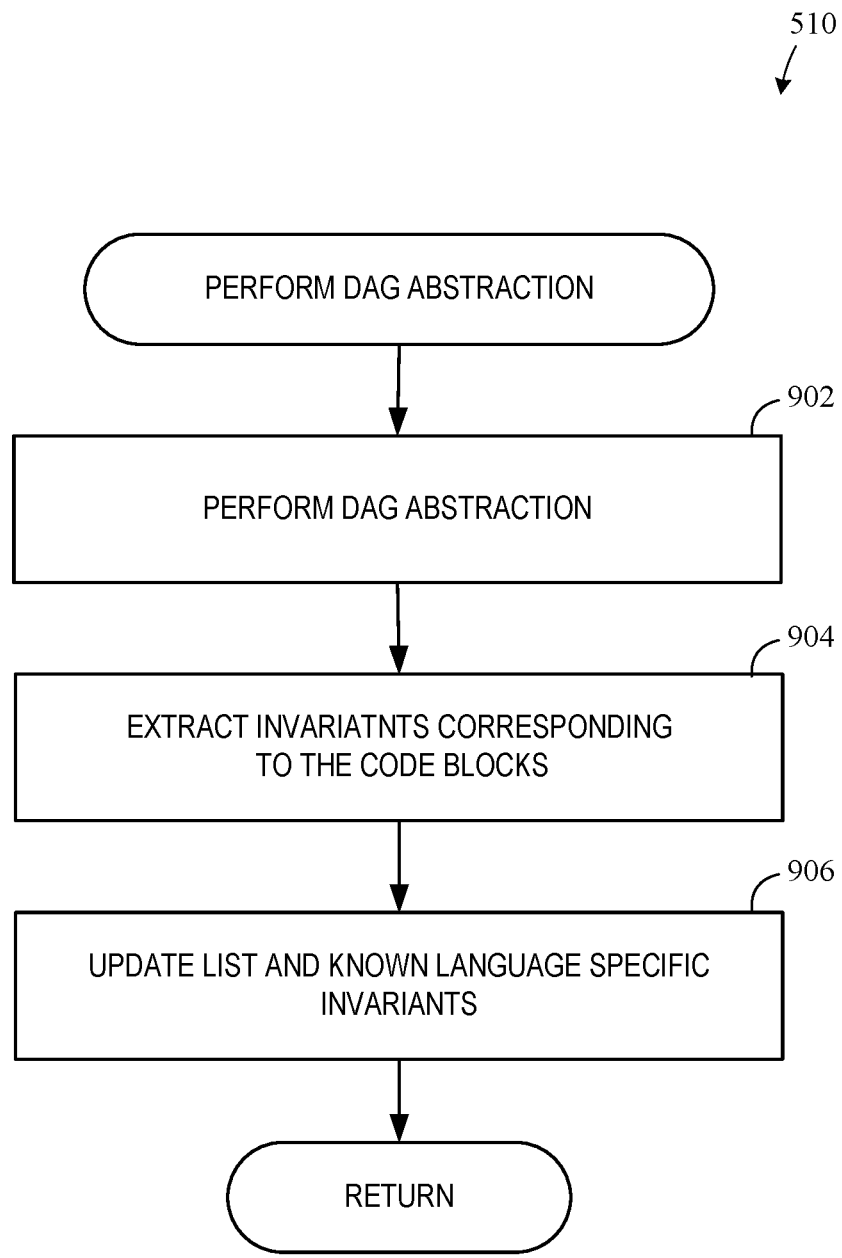

FIG. 9 illustrates further detail corresponding to performing DAG abstraction (block 510) of FIG. 5. In the illustrated example of FIG. 9, the example abstraction generating circuitry 210 performs a DAG abstraction in a manner consistent with Example 4 above (block 902). The example invariant identification circuitry 212 extracts invariants corresponding to the code blocks of interest (block 904) in a manner consistent with Example 5. Additionally, the example invariant identification circuitry 212 updates a list of known language-specific invariants (block 906), and control returns to block 512 of FIG. 5.

Figure 10:
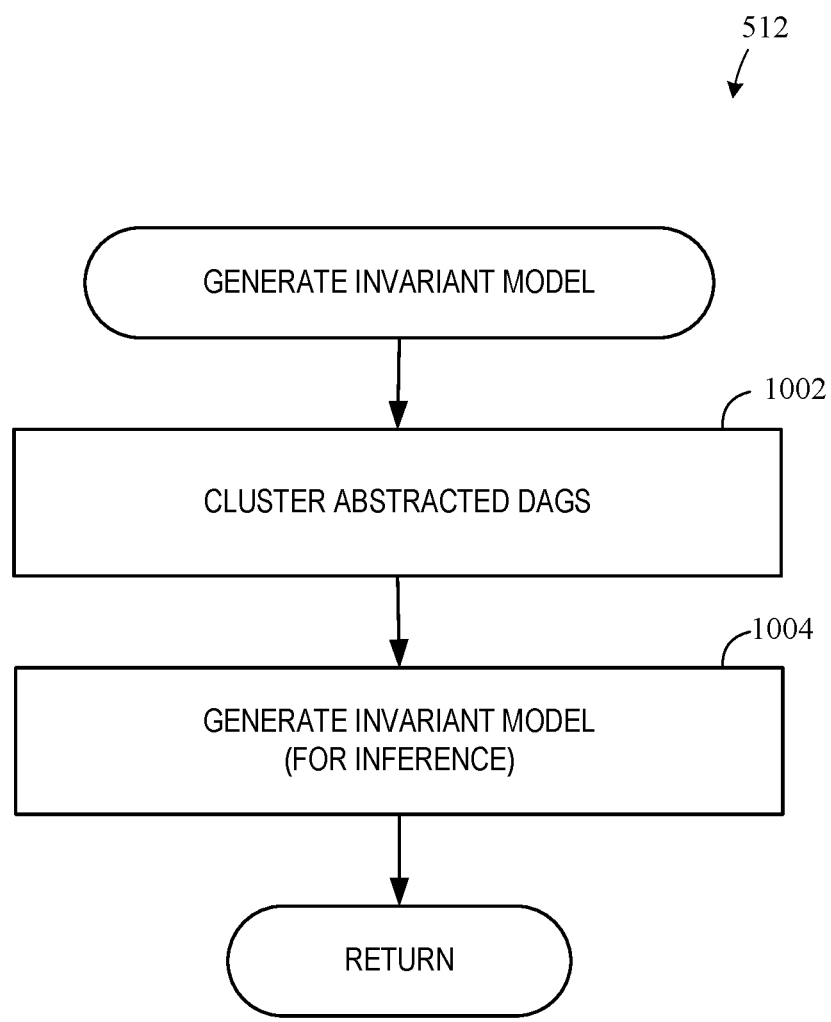

FIG. 10 illustrates further detail corresponding to generating an invariant model to be used for inference (block 512) of FIG. 5. In the illustrated example of FIG. 10, the example model generating circuitry 214 clusters the abstracted DAGs (block 1002) and generates a corresponding invariant model (block 1004). Control then returns to block 502 of FIG. 5 in an effort to continue code defect analysis.

Figure 11:
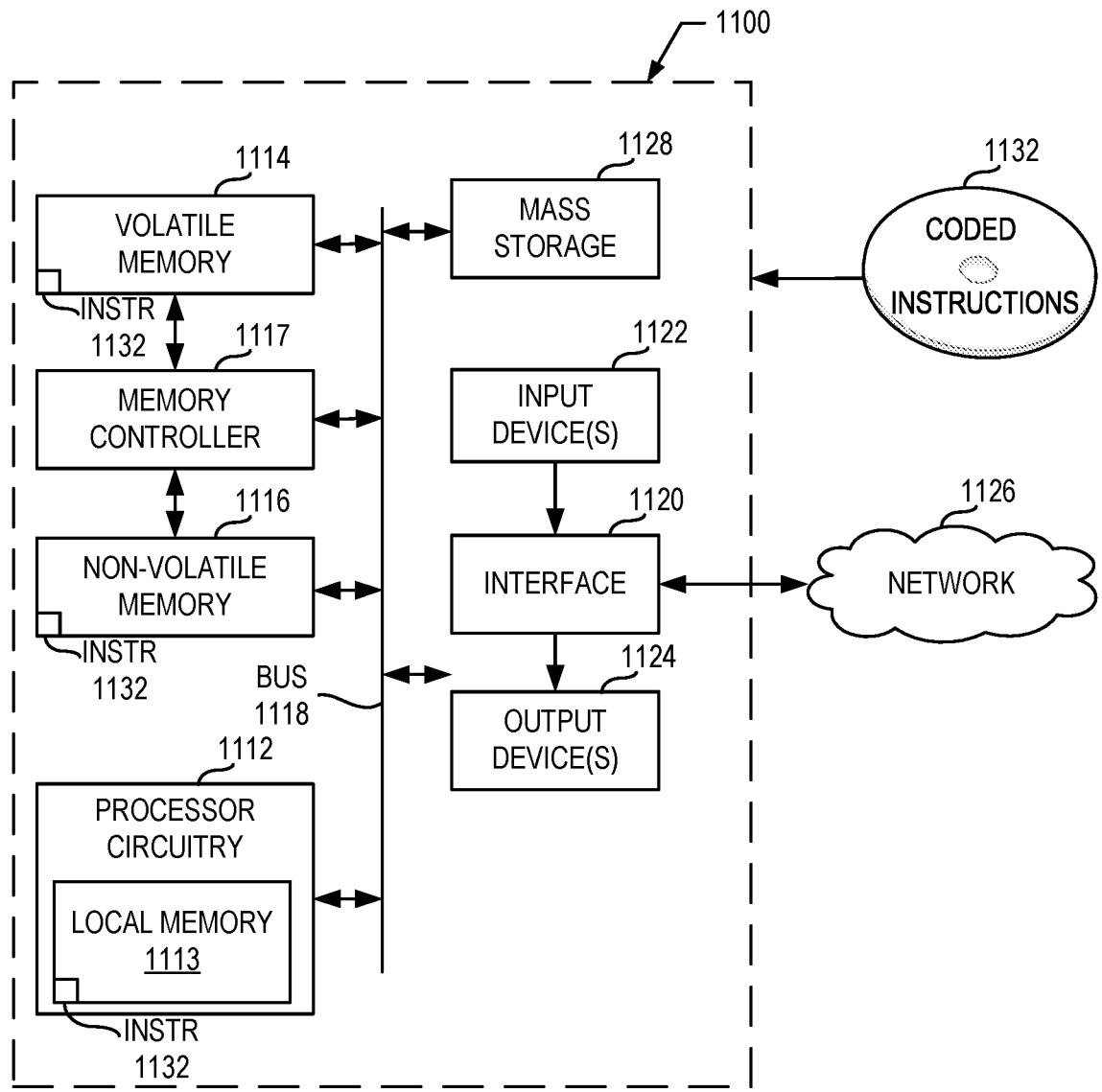
FIG. 11 is a block diagram of an example processing platform including processor circuitry structured to execute the example machine readable instructions of FIGS. 5-10 to implement the example anomaly analyzer circuitry of FIGS. 1 and/or 2 to detect code defects.

FIG. 11 is a block diagram of an example processor platform 1100 structured to execute and/or instantiate the machine readable instructions and/or operations of FIGS. 5-10 to implement the anomaly analyzer circuitry 104 of FIGS. 1 and 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example repository interface circuitry 202, the example source file extractor circuitry 204, the example tree generating circuitry 206, the example DAG generating circuitry 208, the example abstraction generating circuitry 210, the example invariant identification circuitry 212, the example model generating circuitry 214, the example DAG comparison circuitry 216, the example DAG correcting circuitry 218 and the example anomaly analyzer circuitry 104.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 5-10, may be stored in the mass storage device 1128, in the volatile memory 1114, in the non-volatile memory 1116, and/or on a removable non-transitory computer readable storage medium such as a CD or DVD.

Figure 12:
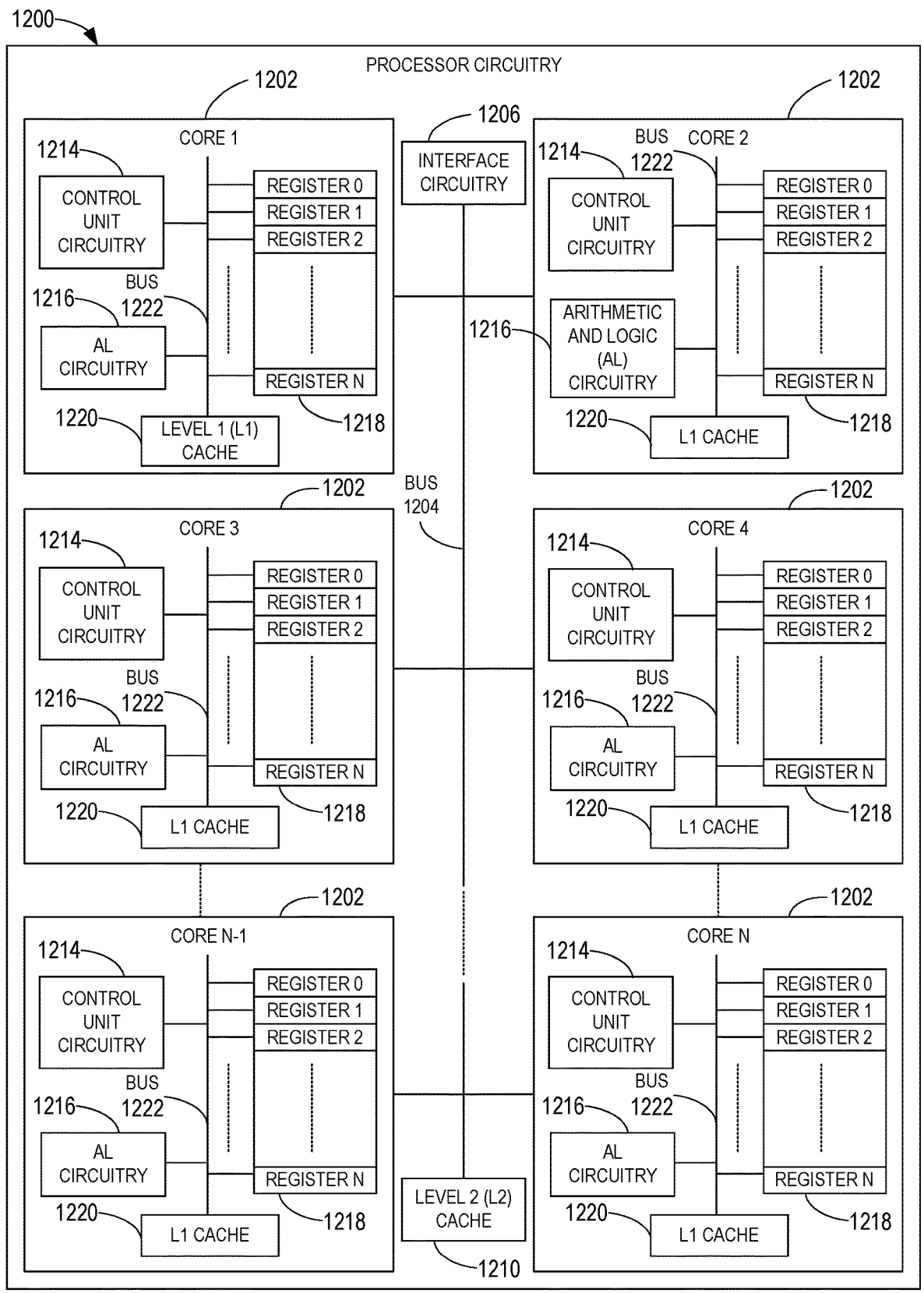
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 5-10.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1204 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
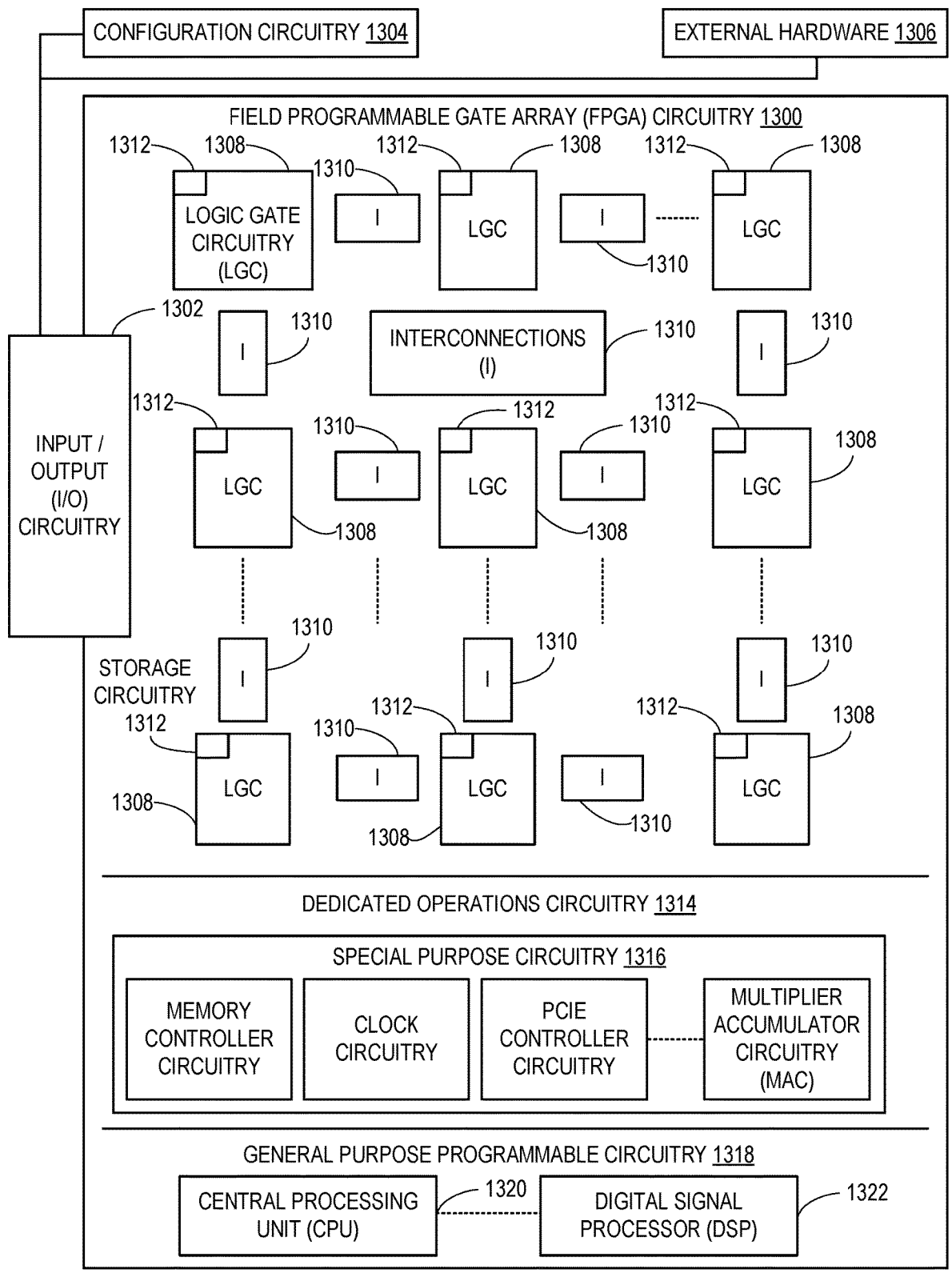
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 5-10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIG. 13. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 5-10. As such, the FPGA circuitry 1300 may be structured to effectively instantiate some or all of the machine readable instructions of the flowcharts of FIGS. 5-10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 5-10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 5-10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an onboard CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIG. 5-10 may be executed by one or more of the cores 1202 of FIG. 12 and a second portion of the machine readable instructions represented by the flowcharts of FIGS. 5-10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
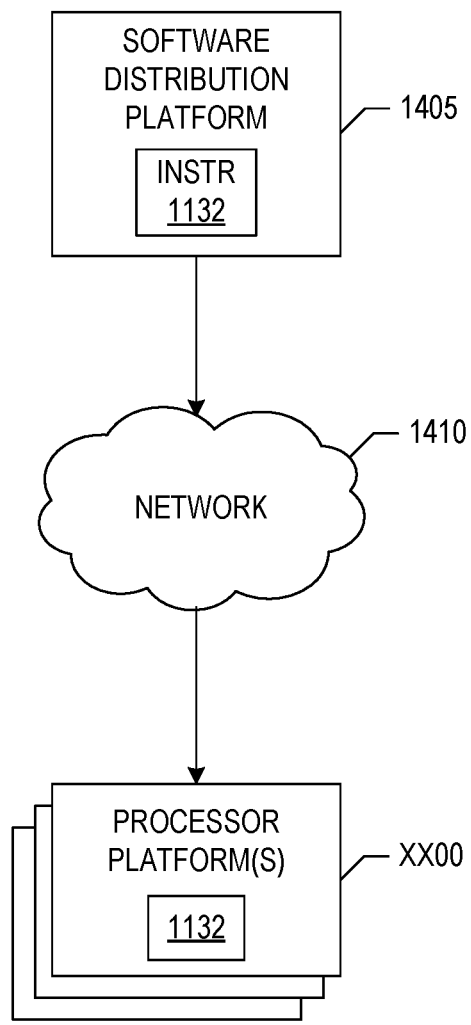
FIG. 14 is a block diagram of an example software distribution platform (e.g., one or more servers) to distribute software (e.g., software corresponding to the example machine readable instructions of FIGS. 5-10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1405 to distribute software such as the example machine readable instructions 1132 of FIG. 11 to hardware devices owned and/or operated by third parties is illustrated in FIG. 14. The example software distribution platform 1405 may be implemented by any computer server, data facility, cloud service, etc., capable of storing and transmitting software to other computing devices. The third parties may be customers of the entity owning and/or operating the software distribution platform 1405. For example, the entity that owns and/or operates the software distribution platform 1405 may be a developer, a seller, and/or a licensor of software such as the example machine readable instructions 1132 of FIG. 11. The third parties may be consumers, users, retailers, OEMs, etc., who purchase and/or license the software for use and/or re-sale and/or sub-licensing. In the illustrated example, the software distribution platform 1405 includes one or more servers and one or more storage devices. The storage devices store the machine readable instructions 1132, which may correspond to the example machine readable instructions of FIGS. 5-11, as described above. The one or more servers of the example software distribution platform 1405 are in communication with a network 1410, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132 from the software distribution platform 1405. For example, the software, which may correspond to the example machine readable instructions 1132 of FIG. 11, may be downloaded to the example processor platform 1100, which is to execute the machine readable instructions 1132 to implement the example anomaly analyzer circuitry 104 of FIGS. 1 and/or 2. In some example, one or more servers of the software distribution platform 1405 periodically offer, transmit, and/or force updates to the software (e.g., the example machine readable instructions 1132 of FIG. 11) to ensure improvements, patches, updates, etc., are distributed and applied to the software at the end user devices.

From the foregoing, it will be appreciated that example systems, methods, apparatus, and articles of manufacture have been disclosed that reduce instances of defective code being released for hardware implementation. The reduction of such instances of defective code improves safety in the underlying implementation of the code in, for example, production and/or consumer environments. Examples disclosed herein also remedy substantial voids in traditional compiler technology that currently fail to identify semantic code errors as distinguished from syntactic code errors. Furthermore, examples disclosed herein perform code defect analysis and inspection in a manner that is agnostic to a code type (e.g., C, C++, Verilog, etc.). The disclosed systems, methods, apparatus, and articles of manufacture are accordingly directed to one or more improvement(s) in the operation of a machine such as a computer or other electronic and/or mechanical device, such as computers that execute compilers.

Example methods, apparatus, systems, and articles of manufacture to detect code defects are disclosed herein. Further examples and combinations thereof include the following:

Example 1 includes an apparatus comprising processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the one or more first operations, the one or more second operations or the one or more third operations to instantiate repository interface circuitry to retrieve code repositories corresponding to a programming language of interest, tree generating circuitry to generate parse trees corresponding to code blocks contained in the code repositories, directed acyclic graph (DAG) circuitry to generate DAGs corresponding to respective ones of the parse trees, the DAGs including control flow information and data flow information, abstraction generating circuitry to abstract the DAGs, invariant identification circuitry to extract invariants from the abstracted DAGs, and DAG comparison circuitry to cluster respective ones of the extracted invariants to identify respective ones of the abstracted DAGs with common invariants.

Example 2 includes the apparatus as defined in example 1, wherein the repository interface circuitry is to retrieve code repositories devoid of label information, the label information corresponding to code validity.

Example 3 includes the apparatus as defined in example 1, wherein the abstraction generating circuitry is to convert programming language specific code elements to normalized code elements.

Example 4 includes the apparatus as defined in example 1, wherein the abstraction generating circuitry is to identify at least one of source nodes or sink nodes in the abstracted DAGs.

Example 5 includes the apparatus as defined in example 4, wherein the abstraction generating circuitry is to replace the at least one of source nodes or sink nodes with normalized variables.

Example 6 includes the apparatus as defined in example 1, wherein the invariant identification circuitry is to identify a relationship between a sensitivity list and source nodes of the abstracted DAGs.

Example 7 includes the apparatus as defined in example 6, wherein the invariant identification circuitry is to determine a size of the sensitivity list, the size of the sensitivity list equal to a number of the source nodes of the abstracted DAGs.

Example 8 includes At least one non-transitory computer readable storage medium comprising instructions that, when executed, cause at least one processor to at least retrieve code repositories corresponding to a programming language of interest, generate parse trees corresponding to code blocks contained in the code repositories, generate directed acyclic graphs (DAGs) corresponding to respective ones of the parse trees, the DAGs including control flow information and data flow information, abstract the DAGs and extract invariants from the abstracted DAGs, and cluster respective ones of the extracted invariants to identify respective ones of the abstracted DAGs with common invariants.

Example 9 includes the at least one computer readable storage medium as defined in example 8, wherein the instructions, when executed, cause the at least one processor to retrieve code repositories devoid of label information, the label information corresponding to code validity.

Example 10 includes the at least one computer readable storage medium as defined in example 8, wherein the instructions, when executed, cause the at least one processor to convert programming language specific code elements to normalized code elements.

Example 11 includes the at least one computer readable storage medium as defined in example 8, wherein the instructions, when executed, cause the at least one processor to identify at least one of source nodes or sink nodes in the abstracted DAGs.

Example 12 includes the at least one computer readable storage medium as defined in example 11, wherein the instructions, when executed, cause the at least one processor to replace the at least one of source nodes or sink nodes with normalized variables.

Example 13 includes the at least one computer readable storage medium as defined in example 8, wherein the instructions, when executed, cause the at least one processor to identify a relationship between a sensitivity list and source nodes of the abstracted DAGs.

Example 14 includes the at least one computer readable storage medium as defined in example 13, wherein the instructions, when executed, cause the at least one processor to determine a size of the sensitivity list, the size of the sensitivity list equal to a number of the source nodes of the abstracted DAGs.

Example 15 includes a method comprising retrieving, by executing an instruction with at least one processor, code repositories corresponding to a programming language of interest, generating, by executing an instruction with the at least one processor, parse trees corresponding to code blocks contained in the code repositories, generating, by executing an instruction with the at least one processor, directed acyclic graphs (DAGs) corresponding to respective ones of the parse trees, the DAGs including control flow information and data flow information, abstracting, by executing an instruction with the at least one processor, the DAGs and extract invariants from the abstracted DAGs, and clustering, by executing an instruction with the at least one processor, respective ones of the extracted invariants to identify respective ones of the abstracted DAGs with common invariants.

Example 16 includes the method as defined in example 15, further including retrieving code repositories devoid of label information, the label information corresponding to code validity.

Example 17 includes the method as defined in example 15, further including converting programming language specific code elements to normalized code elements.

Example 18 includes the method as defined in example 15, further including identifying at least one of source nodes or sink nodes in the abstracted DAGs.

Example 19 includes the method as defined in example 18, further including replacing the at least one of source nodes or sink nodes with normalized variables.

Example 20 includes the method as defined in example 15, further including identifying a relationship between a sensitivity list and source nodes of the abstracted DAGs.

Example 21 includes the method as defined in example 20, further including determining a size of the sensitivity list, the size of the sensitivity list equal to a number of the source nodes of the abstracted DAGs.

Example 22 includes a system comprising means for interfacing to retrieve code repositories corresponding to a programming language of interest, means for generating trees to generate parse trees corresponding to code blocks contained in the code repositories, means for generating a directed acyclic graph (DAG) to generate DAGs corresponding to respective ones of the parse trees, the DAGs including control flow information and data flow information, means for generating abstracted DAGs to abstract the DAGs, means for identifying invariants to extract invariants from the abstracted DAGs, and means for comparing DAGs to cluster respective ones of the extracted invariants to identify respective ones of the abstracted DAGs with common invariants.

Example 23 includes the system as defined in example 22, wherein the means for interfacing is to retrieve code repositories devoid of label information, the label information corresponding to code validity.

Example 24 includes the system as defined in example 22, wherein the means for generating abstracted DAGs is to convert programming language specific code elements to normalized code elements.

Example 25 includes the system as defined in example 22, wherein the means for generating abstracted DAGs is to identify at least one of source nodes or sink nodes in the abstracted DAGs.

Example 26 includes the system as defined in example 25, wherein the means for generating abstracted DAGs is to replace the at least one of source nodes or sink nodes with normalized variables.

Example 27 includes the system as defined in example 22, wherein the means for identifying invariants is to identify a relationship between a sensitivity list and source nodes of the abstracted DAGs.

Example 28 includes the system as defined in example 27, wherein the means for identifying invariants is to determine a size of the sensitivity list, the sensitivity list equal to a number of the source nodes of the abstracted DAGs.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
processor circuitry including one or more of:
- at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
- a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
- Application Specific Integrated Circuitry (ASIC) including logic gate circuitry to perform one or more third operations;

the processor circuitry to perform at least one of the one or more first operations, the one or more second operations or the one or more third operations to instantiate:
repository interface circuitry to retrieve code repositories corresponding to a programming language of interest;
tree generating circuitry to generate parse trees corresponding to code blocks contained in the code repositories;
directed acyclic graph (DAG) circuitry to generate DAGs corresponding to respective ones of the parse trees, the DAGs including control flow information and data flow information;
abstraction generating circuitry to abstract the DAGs;
invariant identification circuitry to extract invariants from the abstracted DAGs; and
DAG comparison circuitry to cluster respective ones of the extracted invariants to identify respective ones of the abstracted DAGs with common invariants.

2. The apparatus as defined in claim 1, wherein the repository interface circuitry is to retrieve code repositories devoid of label information, the label information corresponding to code validity.

3. The apparatus as defined in claim 1, wherein the abstraction generating circuitry is to convert programming language specific code elements to normalized code elements.

4. The apparatus as defined in claim 1, wherein the abstraction generating circuitry is to identify at least one of source nodes or sink nodes in the abstracted DAGs.

5. The apparatus as defined in claim 4, wherein the abstraction generating circuitry is to replace the at least one of source nodes or sink nodes with normalized variables.

6. The apparatus as defined in claim 1, wherein the invariant identification circuitry is to identify a relationship between a sensitivity list and source nodes of the abstracted DAGs.

7. The apparatus as defined in claim 6, wherein the invariant identification circuitry is to determine a size of the sensitivity list, the size of the sensitivity list equal to a number of the source nodes of the abstracted DAGs.

8. At least one non-transitory computer readable storage medium comprising instructions that, when executed, cause at least one processor to at least:
retrieve code repositories corresponding to a programming language of interest;
generate parse trees corresponding to code blocks contained in the code repositories;
generate directed acyclic graphs (DAGs) corresponding to respective ones of the parse trees, the DAGs including control flow information and data flow information;
abstract the DAGs and extract invariants from the abstracted DAGs; and
cluster respective ones of the extracted invariants to identify respective ones of the abstracted DAGs with common invariants.

9. The at least one computer readable storage medium as defined in claim 8, wherein the instructions, when executed, cause the at least one processor to retrieve code repositories devoid of label information, the label information corresponding to code validity.

10. The at least one computer readable storage medium as defined in claim 8, wherein the instructions, when executed, cause the at least one processor to convert programming language specific code elements to normalized code elements.

11. The at least one computer readable storage medium as defined in claim 8, wherein the instructions, when executed, cause the at least one processor to identify at least one of source nodes or sink nodes in the abstracted DAGs.

12. The at least one computer readable storage medium as defined in claim 11, wherein the instructions, when executed, cause the at least one processor to replace the at least one of source nodes or sink nodes with normalized variables.

13. The at least one computer readable storage medium as defined in claim 8, wherein the instructions, when executed, cause the at least one processor to identify a relationship between a sensitivity list and source nodes of the abstracted DAGs.

14. The at least one computer readable storage medium as defined in claim 13, wherein the instructions, when executed, cause the at least one processor to determine a size of the sensitivity list, the size of the sensitivity list equal to a number of the source nodes of the abstracted DAGs.

15. A method comprising:
retrieving, by executing an instruction with at least one processor, code repositories corresponding to a programming language of interest;
generating, by executing an instruction with the at least one processor, parse trees corresponding to code blocks contained in the code repositories;
generating, by executing an instruction with the at least one processor, directed acyclic graphs (DAGs) corresponding to respective ones of the parse trees, the DAGs including control flow information and data flow information;
abstracting, by executing an instruction with the at least one processor, the DAGs and extract invariants from the abstracted DAGs; and
clustering, by executing an instruction with the at least one processor, respective ones of the extracted invariants to identify respective ones of the abstracted DAGs with common invariants.

16. The method as defined in claim 15, further including retrieving code repositories devoid of label information, the label information corresponding to code validity.

17. The method as defined in claim 15, further including converting programming language specific code elements to normalized code elements.

18. The method as defined in claim 15, further including identifying at least one of source nodes or sink nodes in the abstracted DAGs.

19. The method as defined in claim 18, further including replacing the at least one of source nodes or sink nodes with normalized variables.

20. The method as defined in claim 15, further including identifying a relationship between a sensitivity list and source nodes of the abstracted DAGs.

21. The method as defined in claim 20, further including determining a size of the sensitivity list, the size of the sensitivity list equal to a number of the source nodes of the abstracted DAGs.

* * * * *